(12) United States Patent  
Yamauchi

(10) Patent No.: US 11,165,057 B2  
(45) Date of Patent: Nov. 2, 2021

(54) NEGATIVE ELECTRODE ACTIVE MATERIAL FOR POWER STORAGE DEVICE

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 37 days.

(21) Appl. No.: 15/747,445

(22) PCT Filed: Jul. 22, 2016

(86) PCT No.: PCT/JP2016/071546  
§ 371 (c)(1),  
(2) Date: Jan. 25, 2018

(87) PCT Pub. No.: WO2017/029945  
PCT Pub. Date: Feb. 23, 2017

(65) Prior Publication Data  
US 2018/0219221 A1 Aug. 2, 2018

(30) Foreign Application Priority Data  
Aug. 20, 2015 (JP) .............................. JP2015-162745

(51) Int. Cl.  
*H01M 4/38* (2006.01)  
*H01M 4/133* (2010.01)  
(Continued)

(52) U.S. Cl.  
CPC ............ *H01M 4/386* (2013.01); *H01G 11/06* (2013.01); *H01G 11/30* (2013.01); *H01G 11/46* (2013.01);  
(Continued)

(58) Field of Classification Search  
CPC ...................................................... H01M 4/386  
See application file for complete search history.

(56) References Cited

U.S. PATENT DOCUMENTS 6,291,101 B1 9/2001 Kita et al.  
2002/0006552 A1* 1/2002 Ishida ............... H01M 10/0525  
429/303  
(Continued)

FOREIGN PATENT DOCUMENTS

CN 1795578 A 6/2006  
CN 102598370 A 7/2012  
(Continued)

OTHER PUBLICATIONS

ChemSpider (Year: 2020).*  
(Continued)

*Primary Examiner* — Brian R Ohara  
(74) *Attorney, Agent, or Firm* — Keating and Bennett, LLP

(57) ABSTRACT

Provided is a negative electrode active material for a power storage device that has a low operating potential, can increase the operating voltage of the power storage device, and has excellent cycle characteristics. The negative electrode active material for a power storage device, the negative electrode active material containing as elements at least one selected from Si, B, and P; Nb; and O.

7 Claims, 3 Drawing Sheets

(51) Int. Cl.
*H01M 4/134* (2010.01)
*H01M 4/136* (2010.01)
*H01M 4/58* (2010.01)
*H01M 4/583* (2010.01)
*H01M 4/62* (2006.01)
*H01M 10/0525* (2010.01)
*H01M 10/054* (2010.01)
*H01M 10/0567* (2010.01)
*H01M 10/0569* (2010.01)
*H01M 4/02* (2006.01)
*H01G 11/06* (2013.01)
*H01G 11/30* (2013.01)
*H01G 11/46* (2013.01)

(52) U.S. Cl.
CPC ........... *H01M 4/133* (2013.01); *H01M 4/134* (2013.01); *H01M 4/136* (2013.01); *H01M 4/583* (2013.01); *H01M 4/5825* (2013.01); *H01M 4/621* (2013.01); *H01M 10/054* (2013.01); *H01M 10/0525* (2013.01); *H01M 10/0567* (2013.01); *H01M 10/0569* (2013.01); *H01M 2004/027* (2013.01); *H01M 2004/028* (2013.01)

(56) References Cited

U.S. PATENT DOCUMENTS

| | | | | |
|---|---|---|---|---|
| 2002/0028380 | A1* | 3/2002 | Tanjo | H01M 10/0525 429/209 |
| 2006/0216608 | A1* | 9/2006 | Ohata | H01M 2/145 429/246 |
| 2007/0196737 | A1 | 8/2007 | Ohata et al. | |
| 2007/0196738 | A1 | 8/2007 | Ohata et al. | |
| 2007/0202404 | A1 | 8/2007 | Ohata et al. | |
| 2010/0081058 | A1* | 4/2010 | Sano | H01M 4/5825 429/231.5 |
| 2010/0196759 | A1* | 8/2010 | Nakane | H01M 4/133 429/212 |
| 2010/0248001 | A1* | 9/2010 | Kuze | H01M 4/523 429/144 |
| 2011/0294020 | A1 | 12/2011 | Kim et al. | |
| 2012/0208092 | A1* | 8/2012 | Ku | H01M 4/485 429/338 |
| 2013/0260236 | A1* | 10/2013 | Park | H01M 4/5825 429/211 |
| 2013/0266846 | A1* | 10/2013 | Kawasaki | H01M 4/13 429/163 |
| 2015/0140359 | A1* | 5/2015 | Park | H01M 4/0471 429/5 |
| 2015/0162604 | A1 | 6/2015 | Park et al. | |
| 2016/0164082 | A1 | 6/2016 | Yamauchi | |
| 2017/0005337 | A1 | 1/2017 | Ikejiri et al. | |

FOREIGN PATENT DOCUMENTS

| | | |
|---|---|---|
| CN | 104701505 A | 6/2015 |
| CN | 104716372 A | 6/2015 |
| JP | 11-260363 A | 9/1999 |
| JP | 2012-503293 A | 2/2012 |
| JP | 2012-054208 A | 3/2012 |
| JP | 2013-157335 A | 8/2013 |
| JP | 2015-035290 A | 2/2015 |
| JP | 2015-049981 A | 3/2015 |
| WO | 2015/087734 A1 | 6/2015 |

OTHER PUBLICATIONS

Definition of active material (Year: 2021).*
Official Communication issued in International Patent Application No. PCT/JP2016/071546, dated Oct. 18, 2016.
"Abstract #137", 223rd ECS Meeting, 2013 The Electrochemical Society, 1 page.
Official Communication issued in Chinese Patent Application No. 201680048051.9, dated Mar. 30, 2020.

* cited by examiner

[FIG. 1]
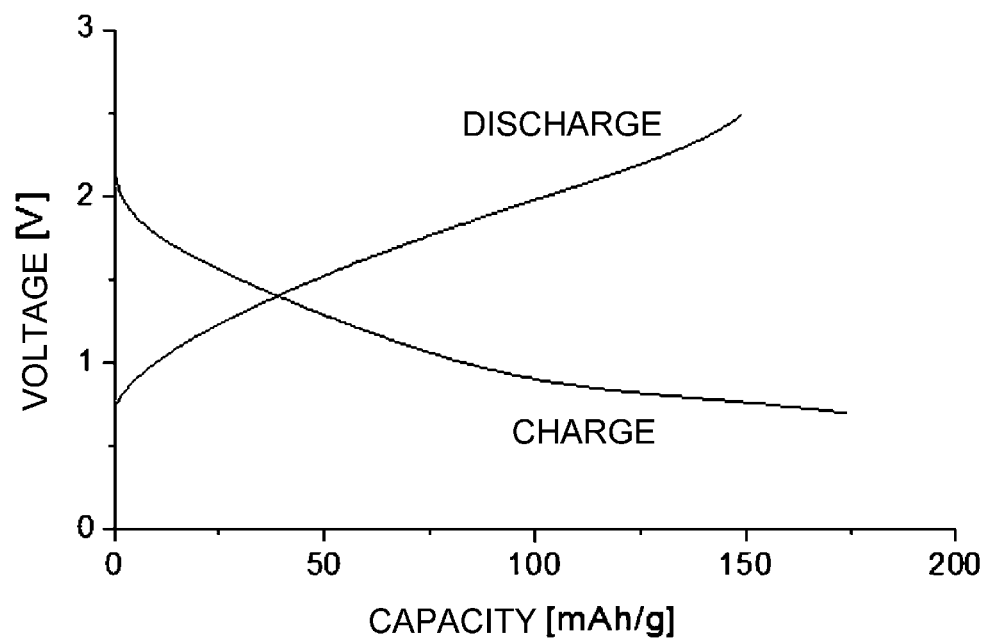
[FIG. 2]
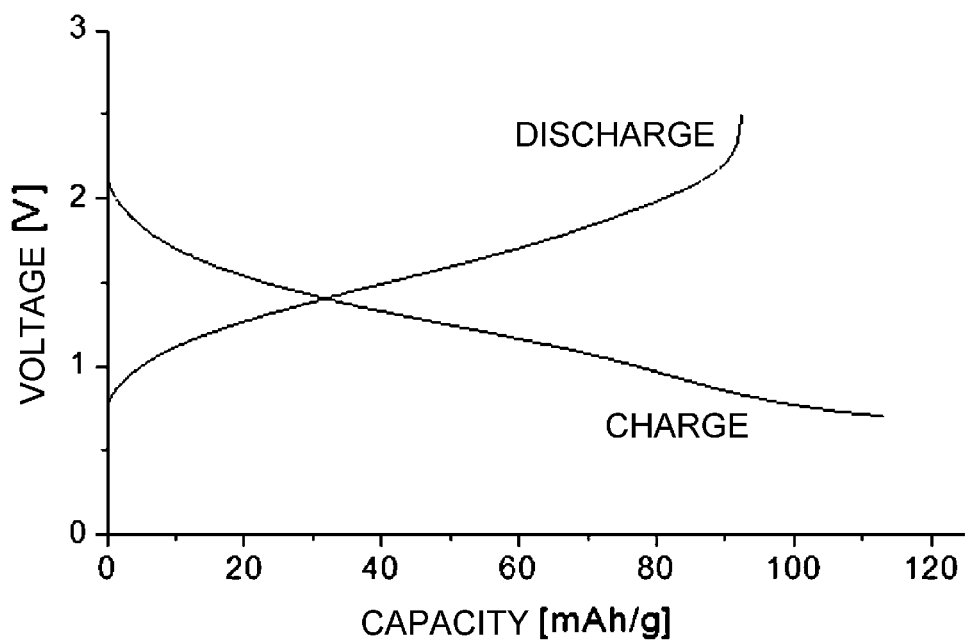

[FIG. 3]
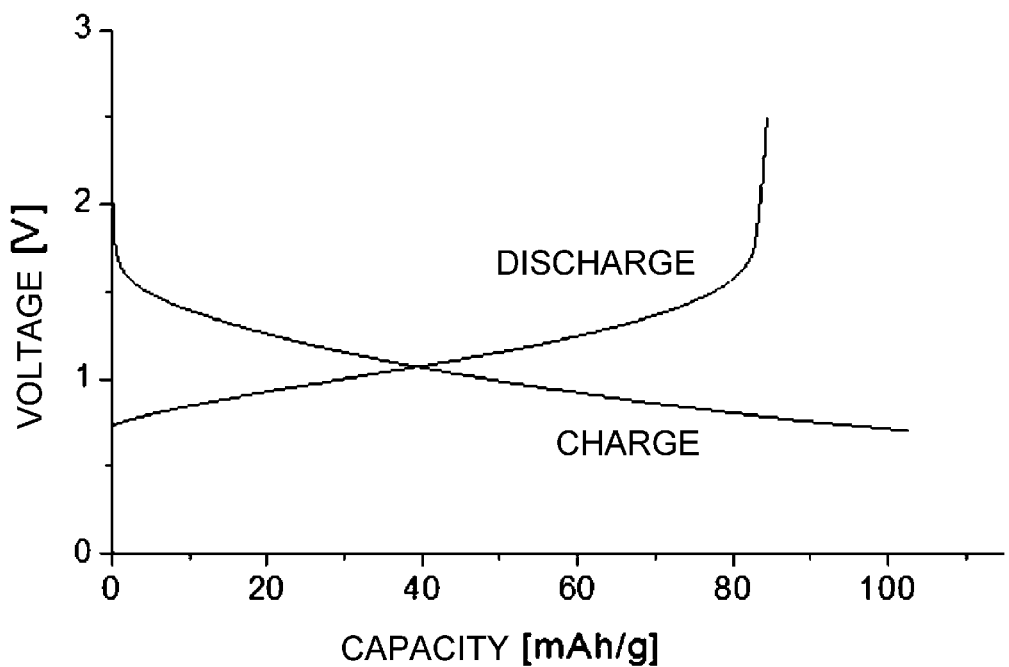
[FIG. 4]
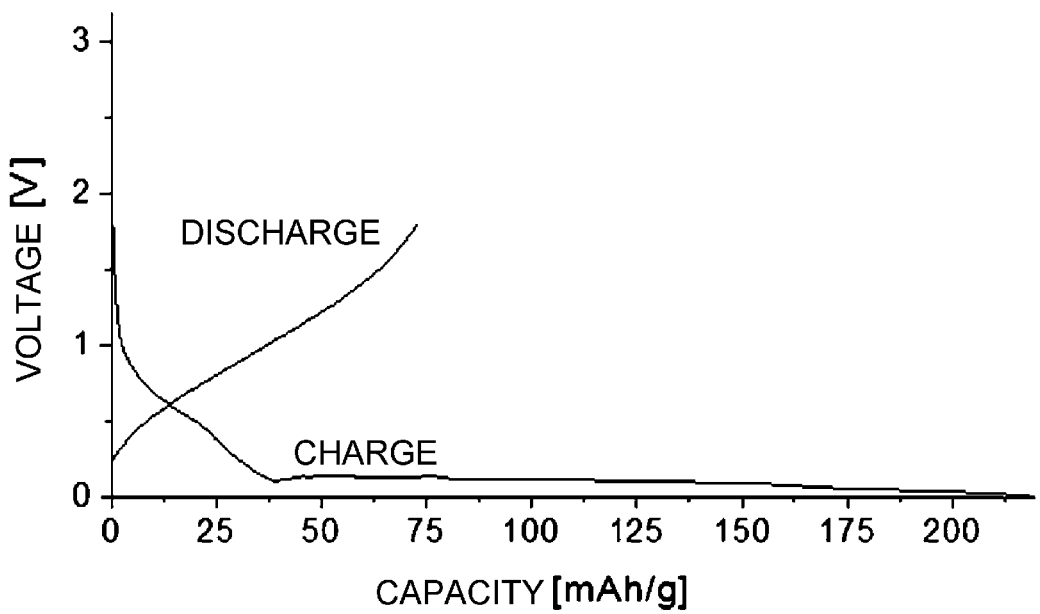

[FIG. 5]
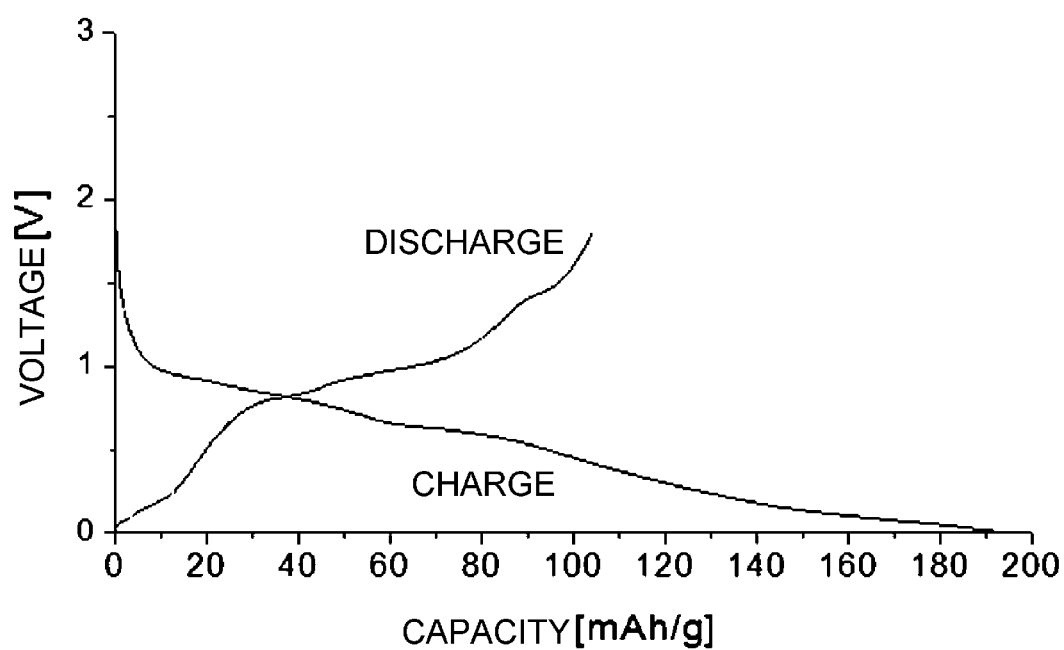

NEGATIVE ELECTRODE ACTIVE MATERIAL FOR POWER STORAGE DEVICE

TECHNICAL FIELD

The present invention relates to negative electrode active materials for use in power storage devices, such as a lithium-ion secondary battery, a sodium-ion secondary battery, and a hybrid capacitor, for use in portable electronic devices, electric vehicles, electric power tools, backup emergency power supplies, and so on.

BACKGROUND ART

Recently, with the widespread use of portable electronic devices, electric vehicles, and so on, developments of power storage devices, including lithium-ion secondary batteries and sodium-ion secondary batteries, have been advanced. Materials containing Si or Sn having a high theoretical capacity are being studied as negative electrode active materials for use in power storage devices. However, with the use of a negative electrode active material containing Si or Sn, the negative electrode active material exhibits a large volume change due to expansion and contraction thereof occurring during insertion/extraction reaction of lithium ions or sodium ions, which presents a problem that there arises a significant collapse of the negative electrode active material due to repeated charges and discharges and, therefore, the cycle characteristics are likely to decrease.

To cope with this, $NaTi_2(PO_4)_3$ and $Na_3Ti_2(PO_4)_3$, which are NASICON-type compounds, are proposed as negative electrode active materials having relatively good cycle characteristics (see, for example, Patent Literature 1 and Non-Patent Literature 1).

CITATION LIST

Patent Literature

Patent Literature 1: JP-A 2012-54208

Non-Patent Literature

Non-Patent Literature 1: Abstract #137, 223rd ECS Meeting, 2013 The Electrochemical Society

SUMMARY OF INVENTION

Technical Problem

The operating voltage of a power storage device is determined by the difference between the operating voltage of the positive electrode and the operating voltage of the negative electrode and becomes larger as the operating voltage of the negative electrode decreases. When $NaTi_2(PO_4)_3$ or $Na_3Ti_2(PO_4)_3$ is used as the negative electrode active material for the power storage device, the $Ti^{4+}/Ti^{3+}$ reaction potential is very high, 2.2 V (vs. $Na/Na^+$), so that the operating voltage of the negative electrode becomes high, which presents a problem that the operating voltage of the power storage device where this negative electrode active material is used becomes low.

$KNb_3O_8$ is known as a negative electrode active material having a relatively low operating voltage but has a problem that its cycle characteristics are insufficient.

In view of the above circumstances, the present invention has an object of providing a negative electrode active material for a power storage device that has a low operating potential, can increase the operating voltage of the power storage device, and has excellent cycle characteristics.

Solution to Problem

The inventor conducted intensive studies and, as a result, found that the above problems can be solved by a negative electrode active material having a specific composition.

Specifically, a negative electrode active material for a power storage device according to the present invention contains as elements at least one selected from Si, B, P, and Al; Nb; and O.

The negative electrode active material for a power storage device according to the present invention preferably contains, in terms of % by mole of oxide, 5 to 90% $Nb_2O_5$ and 5 to 85% $SiO_2+B_2O_3+P_2O_5+Al_2O_3$. Note that "(component)+(component)+ . . . " herein means the total of the contents of the relevant components.

The negative electrode active material for a power storage device according to the present invention preferably further contains, in terms of % by mole of oxide, 1 to 70% $R_2O+R'O$ (where R represents at least one selected from Li, Na, and K and R' represents at least one selected from Mg, Ca, Ba, Zn, and Sr).

The negative electrode active material for a power storage device according to the present invention inserts and extracts alkali ions during charge and discharge, but some alkali ions may remain inserted in the negative electrode active material without being extracted. The remaining alkali ions lead to an irreversible capacity and cause a decrease in first discharge capacity. To cope with this, an $R_2O$ or R'O is previously contained in the negative electrode active material, which makes it difficult for alkali ions to be absorbed into the negative electrode active material during the first charge and thus enables the first discharge capacity to increase. Furthermore, since the negative electrode active material contains $R_2O$ or R'O, the alkali-ion conductivity can be increased. When the alkali-ion conductivity increases, insertion and extraction of alkali ions during charge and discharge are facilitated, so that the redox potential decreases and the operating voltage of the negative electrode can be decreased.

In the negative electrode active material for a power storage device according to the present invention, $R_2O$ is preferably $Na_2O$.

Because $Na_2O$ is present as a plentiful resource and its atomic weight is relatively small, it can relatively increase the content of active material components.

The negative electrode active material for a power storage device according to the present invention preferably contains an amorphous phase.

Since the negative electrode active material contains an amorphous phase, it has excellent diffusivity of alkali ions, such as lithium ions or sodium ions and, therefore, facilitates insertion and extraction of alkali ions during charge and discharge. As a result, the redox potential decreases and the operating voltage of the negative electrode can be decreased. Particularly when the proportion of the amorphous phase is large, the degree of freedom of composition is high, so that the increase in capacity and the decrease in voltage can be easily achieved.

Furthermore, when the negative electrode active material for a power storage device according to the present invention is used in an all-solid-state secondary battery, the amorphous phase is likely to exist at the interface between the negative electrode active material and the solid electrolyte. The amorphous phase serves as a conducting path for alkali ions and therefore decreases the interfacial resistance between the active material crystal and the solid electrolyte, so that the discharge capacity and discharge voltage of the power storage device are likely to increase. Moreover, because the amorphous phase acts as a binder, the adhesive strength between the negative electrode layer and the solid electrolyte layer is increased.

The negative electrode active material for a power storage device according to the present invention is suitable for use in a sodium-ion secondary battery.

A negative electrode material for a power storage device according to the present invention contains the above-described negative electrode active material for a power storage device.

A negative electrode for a power storage device according to the present invention contains the above-described negative electrode material for a power storage device.

A power storage device according to the present invention includes the above-described negative electrode for a power storage device.

Advantageous Effects of Invention

The present invention enables provision of a negative electrode active material for a power storage device that has a low operating potential, can increase the operating voltage of the power storage device, and has excellent cycle characteristics.

BRIEF DESCRIPTION OF DRAWINGS

FIG. 1 is a graph showing first charge/discharge curves of a test cell for a sodium-ion secondary battery in which sample No. 1 as a working example is used.

FIG. 2 is a graph showing first charge/discharge curves of a test cell for a sodium-ion secondary battery in which sample No. 2 as a working example is used.

FIG. 3 is a graph showing first charge/discharge curves of a test cell for a sodium-ion secondary battery in which sample No. 3 as a working example is used.

FIG. 4 is a graph showing first charge/discharge curves of a test cell for a sodium-ion secondary battery in which sample No. 34 as a comparative example is used.

FIG. 5 is a graph showing first charge/discharge curves of a test cell for a sodium-ion secondary battery in which sample No. 35 as a comparative example is used.

DESCRIPTION OF EMBODIMENTS

A negative electrode active material for a power storage device according to the present invention contains as elements at least one selected from the group consisting of Si, B, P, and Al; Nb; and O. With the above composition, a structure is formed in which Nb ions as an active material component are homogeneously dispersed in an oxide matrix containing Si, B, P or Al. As a result, a negative electrode active material capable of reducing the volume change during insertion and extraction of alkali ions and having excellent cycle characteristics can be obtained.

The negative electrode active material for a power storage device according to the present invention preferably contains, in terms of % by mole of oxide, 5 to 90% $Nb_2O_5$ and 5 to 85% $SiO_2+B_2O_3+P_2O_5+Al_2O_3$. Reasons why each of the components is limited in this manner will be described below. Note that in the description of the content of each component "%" refers to "% by mole" unless otherwise stated.

$Nb_2O_5$ is an active material component serving as sites where alkali ions are inserted and extracted. The content of $Nb_2O_5$ is preferably 5 to 90%, more preferably 7 to 79%, still more preferably 9 to 69%, yet still more preferably 11 to 59%, yet still more preferably 13 to 49%, and particularly preferably 15 to 39%. If $Nb_2O_5$ is too less, the discharge capacity per unit mass of the negative electrode active material tends to be small and the charge/discharge efficiency during the first charge and discharge tends to decrease. On the other hand, if $Nb_2O_5$ is too much, the volume change due to insertion and extraction of alkali ions during charge and discharge becomes unable to be reduced, so that the cycle characteristics tend to decrease.

$SiO_2$, $B_2O_3$, $P_2O_5$, and $Al_2O_3$ are network forming oxides and have the effect of surrounding alkali-ion insertion and extraction sites in $Nb_2O_5$ to increase the cycle characteristics. $SiO_2+B_2O_3+P_2O_5+Al_2O_3$ is preferably 5 to 85%, more preferably 6 to 79%, still more preferably 7 to 69%, yet still more preferably 8 to 59, yet still more preferably 9 to 49%, and particularly preferably 10 to 39%. If $SiO_2+B_2O_3+P_2O_5+Al_2O_3$ is too less, the volume change of the Nb component due to insertion and extraction of alkali ions during charge and discharge becomes unable to be reduced, so that a structural collapse occurs and, thus, the cycle characteristics are likely to decrease. On the other hand, if $SiO_2+B_2O_3+P_2O_5+Al_2O_3$ is too much, the content of $Nb_2O_5$ becomes relatively small, so that the charge/discharge capacity per unit mass of the negative electrode active material tends to be small.

Respective preferred ranges of contents of the components $SiO_2$, $B_2O_3$, $P_2O_5$, and $Al_2O_3$ are as follows.

The content of $SiO_2$ is preferably 0 to 55%, more preferably 0.1 to 55%, still more preferably 0.2 to 45%, yet still more preferably 0.5 to 35%, and particularly preferably 1 to 25%. If $SiO_2$ is too much, crystals of $SiO_2$, $SiP_2O_7$, and so on precipitate and the $SiO_2$ network becomes likely to be broken, so that the cycle characteristics are likely to decrease.

The content of $P_2O_5$ is preferably 0 to 80%, more preferably 0.1 to 80%, still more preferably 0.2 to 72%, yet still more preferably 0.5 to 65%, and particularly preferably 1 to 40%. If $P_2O_5$ is too much, the water resistance decreases, so that, upon production of an aqueous electrode paste, undesirable other crystals are likely to be produced. As a result, the $P_2O_5$ network in the negative electrode active material is broken, so that the cycle characteristics are likely to decrease.

The content of $B_2O_3$ is preferably 0 to 80%, more preferably 0.1 to 80%, still more preferably 0.2 to 45%, and particularly preferably 0.5 to 20%. If $B_2O_3$ is too much, the water resistance is likely to decrease, so that the negative electrode active material absorbs moisture to break the $B_2O_3$ network and, therefore, the cycle characteristics are likely to decrease.

The content of $Al_2O_3$ is preferably 0 to 55%, more preferably 0.1 to 55%, still more preferably 0.2 to 45%, yet still more preferably 0.5 to 35%, and particularly preferably 1 to 25%. If $Al_2O_3$ is too much, unreacted products of $Al_2O_3$ or an $Al_2O_3$ crystal precipitates and the $Al_2O_3$ network becomes likely to be broken, so that the cycle characteristics are likely to decrease.

Among them, $SiO_2$ and $P_2O_5$ not only increase the cycle characteristics but also have excellent alkali-ion conductivity and, therefore, have the effect of increasing the rate characteristic. Most preferred is $SiO_2$. $SiO_2$ has not only the above effects but also the effect of decreasing the redox potential (voltage) during charge and discharge, so that the operating voltage of the negative electrode can be decreased.

The negative electrode active material according to the present invention may contain, in addition to the above components, $R_2O+R'O$ (where R represents at least one selected from Li, Na, and K and R' represents at least one selected from Mg, Ca, Ba, Zn, and Sr). $R_2O$ and $R'O$ are components that make it difficult for alkali ions to be absorbed into the oxide matrix during the first charge to increase the first charge/discharge efficiency, and they increase the alkali-ion conductivity and thus have the effect of decreasing the discharge voltage. The content of $R_2O+R'O$ is preferably 1 to 70%, more preferably 3 to 65%, still more preferably 5 to 59%, yet still more preferably 7 to 55%, yet still more preferably 10 to 51%, and particularly preferably 20 to 50%. If the content of $R_2O+R'O$ is too small, the above effects are less likely to be achieved. On the other hand, if the content of $R_2O+R'O$ is too large, other crystals made of an alkali ion or an alkaline-earth ion and $SiO_2$, $B_2O_3$, $P_2O_5$ or $Al_2O_3$ (for example, $Li_3PO_4$, $Na_4P_2O_7$, $NaPO_4$ or $NaBO_2$) are formed in large amounts, so that the cycle characteristics are likely to decrease. Furthermore, the content of the active material components relatively decreases, so that the discharge capacity tends to decrease. The content of $R_2O$ is preferably 0 to 70%, more preferably 1 to 70%, still more preferably 3 to 65%, yet still more preferably 5 to 59%, yet still more preferably 7 to 55%, yet still more preferably 10 to 51%, and particularly preferably 20 to 50%. The content of R'O is preferably 0 to 70%, more preferably 1 to 70%, still more preferably 3 to 65%, yet still more preferably 5 to 59%, yet still more preferably 7 to 55%, yet still more preferably 10 to 51%, and particularly preferably 20 to 50%. The content of each of $Li_2O$, $Na_2O$, $K_2O$, MgO, CaO, SrO, BaO, and ZnO is preferably 0 to 70%, more preferably 1 to 70%, still more preferably 3 to 65%, yet still more preferably 5 to 59%, yet still more preferably 7 to 55%, yet still more preferably 10 to 51%, and particularly preferably 20 to 50%.

$Li_2O$, $Na_2O$, $K_2O$, MgO, CaO, SrO, BaO, and ZnO may be contained singly or in a mixture of two or more of them in the negative electrode active material. Among them, $Na_2O$, $K_2O$, MgO, and CaO present as plentiful resources are preferred and $Na_2O$ having a small atomic weight is more preferred because it can relatively increase the content of active material components. When during charge and discharge in the power storage device, ions inserted from or extracted to the positive electrode through the electrolyte are lithium ions, the negative electrode active material preferably contains $Li_2O$. When these ions are sodium ions, the negative electrode active material preferably contains $Na_2O$. When these ions are potassium ions, the negative electrode active material preferably contains $K_2O$.

The molar ratio $Nb_2O_5/(SiO_2+B_2O_3+P_2O_5+Al_2O_3)$ between the content of $Nb_2O_5$ and the content of $SiO_2+B_2O_3+P_2O_5+Al_2O_3$ is preferably 0.05 to 5, more preferably 0.1 to 4, still more preferably 0.15 to 3, and particularly preferably 0.2 to 2. If $Nb_2O_5/(SiO_2+B_2O_3+P_2O_5+Al_2O_3)$ is too small, the negative electrode active material has poor homogeneity, so that the cycle characteristics tend to decrease. On the other hand, if $Nb_2O_5/(SiO_2+B_2O_3+P_2O_5+Al_2O_3)$ is too large, this results in an inability to reduce the volume change of the Nb component, so that the cycle characteristics tend to decrease.

The molar ratio $(R_2O+R'O)/(SiO_2+B_2O_3+P_2O_5+Al_2O_3)$ between the content of $R_2O+R'O$ and the content of $SiO_2+B_2O_3+P_2O_5+Al_2O_3$ is preferably 0.1 to 5, more preferably 0.2 to 3, still more preferably 0.4 to 2, and particularly preferably 0.5 to 1.5. If $(R_2O+R'O)/(SiO_2+B_2O_3+P_2O_5+Al_2O_3)$ is too small, the content of alkali ions in the oxide matrix decreases to decrease the ion conductivity, so that the redox potential during charge and discharge tends to increase. On the other hand, if $(R_2O+R'O)/(SiO_2+B_2O_3+P_2O_5+Al_2O_3)$ is too large, the oxide matrix becomes unable to reduce the volume change of Nb ions, so that the cycle characteristics tend to decrease.

In addition to the above components, various components can be added to the negative electrode active material without impairing the effects of the present invention. Examples of such components include, in terms of oxides, CuO, $WO_3$, SnO, $Bi_2O_3$, $Fe_2O_3$, $GeO_2$, $TiO_2$, $ZrO_2$, $V_2O_5$, and $Sb_2O_5$. These components facilitate vitrification or function as active materials. Among them, $TiO_2$ and $V_2O_5$ are preferred because they serve as active material components, and $TiO_2$ is particularly preferred. The content of the above components is, in total, preferably 0 to 40%, more preferably 0 to 30%, still more preferably 0.1 to 20%, and particularly preferably 0.2 to 10%.

The negative electrode active material according to the present invention preferably contains an amorphous phase. Thus, the alkali-ion conductivity can be increased and, as a result, effects including an increase in rapid charge/discharge characteristics and an increase in cycle characteristics can be easily achieved. The content of the amorphous phase in the negative electrode active material according to the present invention is, in % by mass, preferably 30% or more, more preferably 50% or more, still more preferably 60% or more, yet still more preferably 80% or more, yet still more preferably 90% or more, yet still more preferably 99%, particularly preferably 99.9% or more, and most preferably 100% (that is, the negative electrode active material is made of amorphous).

The content of amorphous can be determined by using a diffraction line profile at 2θ values of 10 to 60° obtained by powder X-ray diffraction measurement using CuKα rays and making a peak separation of the profile into crystalline diffraction lines and an amorphous halo. Specifically, the background is subtracted from the diffraction line profile to obtain a total scattering curve, a broad diffraction curve (amorphous halo) at 10 to 45° is peak-separated from the total scattering curve and integrated in intensity, the obtained integrated intensity of the halo is represented as Ia, crystalline diffraction lines of each of crystalline phases detected at 10 to 60° are peak-separated from the total scattering curve and integrated in intensity, and the sum of the obtained integrated intensities of the crystalline diffraction lines is represented as Ic. In this case, the content Xa of amorphous phase can be determined from the following equations.

$$Xc=[Ic/(Ic+Ia)]\times100(\%)$$

$$Xa=100-Xc(\%)$$

The negative electrode active material according to the present invention may contain a crystalline phase represented by a general formula $R_{x1}R'_{x2}Nb A_y O_z$ (where R represents at least one selected from Li, Na, and K, R' represents at least one selected from Mg, Ca, Ba, Zn, and Sr, A represents at least one selected from P, Si, B, and Al, $0\le x1\le 8$, $0\le x2\le 8$, $0\le y\le 5$, and $0.1\le z\le 13.5$). The above crystalline phase has an ordered structure. Therefore, upon occurrence of redox of Nb ions during charge and discharge, the structural change due to insertion and extraction of alkali ions also occurs in an orderly manner. As a result, the redox potential shows a constant voltage and, therefore, the resultant power storage device tends to be less likely to cause a voltage drop. Furthermore, small energy is needed for the redox potential, so that the charge/discharge voltage of the negative electrode can be decreased. As a result, a power storage device in which the negative electrode active material according to the present invention is used tends to have a high operating potential. Note that in the case of aiming at preferentially achieving these effects, the crystal content is, in % by mass, preferably 10% or more, more preferably 20% or more, and particularly preferably 30% or more.

R is a component that increases the alkali-ion conductivity to decrease the resistance, thus decreasing the discharge voltage. The negative electrode active material for a power storage device according to the present invention inserts and extracts alkali ions during charge and discharge, but some alkali ions may remain inserted in the negative electrode active material without being extracted. The remaining alkali ions lead to an irreversible capacity and cause a decrease in first discharge capacity. To cope with this, an R component is previously contained in the negative electrode active material, which makes it difficult for alkali ions to be absorbed into the negative electrode active material during the first charge and thus enables the first discharge capacity to increase. The range of values of x1 is preferably $0 \leq x1 \leq 8$, more preferably $0.01 \leq x1 \leq 7$, still more preferably $0.25 \leq x1 \leq 5$, yet still more preferably $0.3 \leq x1 \leq 4$, yet still more preferably $0.5 \leq x1 \leq 3$, and particularly preferably $0.6 \leq x1 \leq 3$. If x is too large, other crystals made of an alkali ion and $P_2O_5$ (for example, $Li_3PO_4$, $Na_4P_2O_7$ or $NaPO_4$) are formed in large amounts, so that the cycle characteristics are likely to decrease. Furthermore, the content of the active material components relatively decreases, so that the discharge capacity tends to decrease.

Li, Na, and K may be singly contained as R in the negative electrode active material. Among them, Na and K present as plentiful resources are preferred and Na having a small atomic weight is particularly preferred because it can relatively increase the content of active material components. When during charge and discharge of the power storage device ions inserted from or extracted to the positive electrode through the electrolyte are lithium ions, the active material preferably contains Li. When these ions are sodium ions, the active material preferably contains Na. When these ions are potassium ions, the active material preferably contains K.

R' is a component that stabilizes the crystal structure. Furthermore, R' has the effect of making it difficult for alkali ions to be absorbed into the negative electrode active material during the first charge and thus increasing the first charge/discharge efficiency. The range of values of x2 is preferably $0 \leq x2 \leq 8$, more preferably $0 \leq x2 \leq 6$, still more preferably $0 \leq x2 \leq 5$, yet still more preferably $0 \leq x2 \leq 4$, yet still more preferably $0 \leq x2 \leq 3$, yet still more preferably $0.1 \leq x2 \leq 3$, yet still more preferably $0.1 \leq x2 \leq 2$, and particularly preferably $0.2 \leq x2 \leq 1.5$. If x2 is too large, other crystals containing an alkaline-earth ion (for example, $BaB_2O_4$) are formed in large amounts, so that the cycle characteristics are likely to decrease. Furthermore, the content of the active material components relatively decreases, so that the discharge capacity tends to decrease. Mg, Ca, Sr, and Ba may be singly contained as R' in the negative electrode active material. Among them, Mg, Ca, and Sr present as plentiful resources are preferred and Mg and Ca having a small atomic weight are particularly preferred because they can relatively increase the content of active material components.

A is a component that has excellent alkali-ion conductivity, acts as a portion of the network forming oxide embracing Nb ions serving as an active material component, and increases the cycle characteristics. The range of values of y is preferably $0 \leq y \leq 5$, more preferably $0.01 \leq y \leq 4.5$, still more preferably $0.1 \leq y \leq 4$, yet still more preferably $0.3 \leq y \leq 3$, and particularly preferably $0.5 \leq y \leq 2$. If y is too large, the content of Nb component functioning as an active material relatively decreases, so that the discharge capacity tends to decrease.

P, Si, B, and Al may be singly contained as A in the negative electrode active material. Among them, P and Si having high ion conductivity are preferred and P having excellent network formation performance for embracing Nb ions serving as an active material component is particularly preferred because its ease of increasing the cycle characteristics.

The range of values of z is preferably $0.1 \leq z \leq 13.5$, more preferably $0.5 \leq z \leq 11.5$, still more preferably $1 \leq z \leq 9$, yet still more preferably $2 \leq z \leq 8$, and particularly preferably $3 \leq z \leq 7$. If z is too small, Nb is reduced to decrease the valence, so that the redox reaction accompanying charge and discharge becomes less likely to occur. As a result, the amount of alkali ions inserted and extracted is reduced, so that the capacity of the power storage device tends to decrease. On the other hand, if z is too large, other crystals (for example, $Li_3PO_4$, $Na_4P_2O_7$ or $NaPO_4$) are formed in large amounts, so that the cycle characteristics are likely to decrease. Furthermore, the content of the active material components relatively decreases, so that the discharge capacity tends to decrease.

The negative electrode active material according to the present invention may contain a crystal of $Nb(P_{2.02}O_7)$, $Nb_2P_4O_{15}$, $Nb(P_{1.92}O_7)$, $NbP_{1.8}O_7$, $Nb_2(PO_4)_3$, $Nb_{1.91}P_{2.82}O_{12}$, $Nb_5P_7O_{30}$, $NbPO_5$, $Nb_{18}(P_{2.5}O_{50})$, $PNb_9O_5$, $Nb_{44}P_2O_{115}$, $NaSi_{0.7}Nb_{10.3}O_{19}$, $Na_{0.17}Si_{0.22}Nb_{9.44}O_{18.33}$, $Na_{0.5}Nb_2(PO_4)_3$, $Na_4Nb_8(P_6O_{35})$, $Na_6(Nb_8P_2O_{29})(P_3O_6)$, $Na_{2.667}Nb_6P_4O_{26}$, $Na_3Nb_7P_4O_{29}$, $Na_2Nb_6P_4O_{26}$, $Na_4Nb_8P_4O_{32}$, $Na_{3.04}(Nb_7P_4O_{29})$, $NaNb_2PO_8$, $Na_5NbO_5$, $Na_4NbO_4$, $Na_3NbO_4$, $Na_2NbO_3$, $NaNbO_2$, $NaNbO_3$, $Na_{0.66}NbO_2$, $Na_2Nb_4O_{11}$, $Na_{13}Nb_{35}O_{94}$, $NaNb_3O_8$, $Na_2Nb_8O_{21}$, $NaNb_7O_{18}$, $Na_2Nb_{20}O_{51}$, $NaNb_{10}O_{18}$, $NaNb_{13}O_{33}$, $NaNbO_3Li_{0.02}$, $Li_{0.6}Na_{0.4}NbO_3$, $Li_{0.2}K_{0.6}Na_{0.2}NbO_3$, $K_3Na_3Nb_8P_5O_{35}$, $K_2Na_{1.73}Nb_8P_5O_{34}$, $Na_{0.35}K_{0.65}NbO_3$, $K_{0.4}Na_{0.6}NbO_3$, $Na_{0.9}K_{0.1}NbO_3$, $Na_{0.98}K_{0.2}NbO_3$, $NbBO_4$, $Nb_3BO_9$, $Nb_{12}O_9$, $Nb_2O_5$, $Nb_4O_5$, $Nb_6O$, $NbO$, $Nb_{0.76}$, $NbO_{0.7}$, $NbO_{1.1}$, $NbO_{1.929}$, $NbO_2$, $NbO_{20.4}$, $NbO_{2.46}$, $NbO_{2.49}$, $Li_7NbO_6$, $Li_{10}Nb_2O_{10}$, $Li_8Nb_2O_9$, $Li_3NbO_4$, $Li_{1.03}Nb_{1.00}O_3$, $LiNbO_2$, $LiNbO_3$, $Li_{1.9}Nb_2O_5$, $(Li_{0.951}Nb_{0.0098})NbO_3$, $(Li_{0.947}Nb_{0.010})(NbO_3)$, $Li_{12}Nb_{13}O_{33}$, $Li_{0.92}Nb_{1.01}O_3$, $Li_{0.9}Nb_{0.99}O_3$, $(Li_{0.904}Nb_{0.0192})NbO_3$, $(Li_{0.891}Nb_{0.013})Nb_{0.992}O_3$, $Li_{0.91}Nb_{1.03}O_3$, $Li_{0.87}Nb_{1.02}O_3$, $Li_{0.85}NbO_3$, $Li_{0.85}Nb_{1.01}O_3$, $Li_{0.85}Nb_{1.04}O_3$, $Li_{0.795}NbO_2$, $Li_{0.58}NbO_2$, $LiNb_3O_8$, $Li_2Nb_{32}O_{81}$, $KLi_4(NbO_5)$, $K_3Li_2Nb_5O_{15}$, $Li_{4.07}K_{5.70}Nb_{10.23}O_{30}$, $K_3LiNb_6O_{17}$, $Li_4KNb_5O_{15}$, $Li_9KNb_{10}O_{30}$, $Li_{19}KNb_{20}O_{60}$, $K_4Nb_8(SiP_4O_{34})$, $K_4(NbO)_2(Si_8O_{21})$, $KNbSi_2O_7$, $K_6Nb_6Si_4O_6$, $K_3NbP_2O_9$, $KNbOP_2O_7$, $KNb_3P_3O_{15}$, $K_5Nb_8P_5O_{34}$, $K_3Nb_6P_4O_{26}$, $K_4Nb_8(P_5O_{34})$, $K_7Nb_{14.13}P_{8.87}O_{60}$, $KNbB_2O_6$, $K_3Nb_3B_2O_{12}$, $K_3NbO_4$, $K_4Nb_2O_7$, $KNbO_3$, $K_4Nb_6O_{17}$, $K_{5.75}Nb_{10.85}O_{30}$, $K_2NbO_{11}$, $K_8Nb_{18}O_{49}$, $K_3Nb_7O_{19}$, $K_2Nb_5O_9$, $K_3Nb_8O_1$, $KNb_3O_5$, $KNb_3O_8$, $K_{1.12}Nb_{3.76}O_6$, $KNb_{3.76}O_6$, $K_2Nb_8O_1$, $K_2O(Nb_2O_5)_7$, $K_2Nb_{16}O_{41}$, $KNb_8O_{14}$, $K_2Nb_{24}O_{61}$, $KNb_{13}O_{33}$, $Ba_3Nb_6Si_4O_{26}$, $Ca_5Nb_2Si_4O_{18}$, $AlNbO_4$ or so on.

When the negative electrode active material according to the present invention is in powder form, its average particle size is preferably 0.1 to 20 μm, more preferably 0.2 to 15 μm, still more preferably 0.3 to 10 μm, and particularly preferably 0.5 to 5 µm. Furthermore, its maximum particle size is preferably 150 µm or less, more preferably 100 µm or less, still more preferably 75 µm or less, and particularly preferably 55 µm or less. If the average particle size or maximum particle size is too large, this results in an inability to reduce the volume change of the negative electrode active material due to insertion and extraction of alkali ions during charge and discharge, so that the negative electrode active material is likely to peel off the current collector and the cycle characteristics tend to significantly decrease. On the other hand, if the average particle size is too small, the dispersed state of the negative electrode active material powder when produced in paste form becomes poor, so that the production of a homogeneous electrode tends to be difficult. Furthermore, the specific surface area becomes excessively large, so that in producing a paste for electrode formation, the negative electrode active material powder is less likely to be dispersed, which needs a large amount of binder and solvent. Moreover, the applicability of the paste for electrode formation becomes poor, which makes it difficult to form a negative electrode having a uniform thickness.

Here, the average particle size and the maximum particle size refer to a median primary particle diameter D50 (diameter at 50% cumulative volume) and a median primary particle diameter D90 (diameter at 90% cumulative volume), respectively, and are values measured by a laser diffraction particle size distribution measurement device.

The specific surface area of the negative electrode active material in powder state measured by the BET method is preferably 0.1 to 20 $m^2/g$, more preferably 0.15 to 15 $m^2/g$, and particularly preferably 0.2 to 10 $m^2/g$. If the specific surface area of the negative electrode active material is too small, alkali ions cannot be rapidly inserted and extracted, so that the charge/discharge time tends to be long. On the other hand, if the specific surface area of the negative electrode active material in powder state is too large, the dispersed state of negative electrode active material powder in producing a paste for electrode formation containing a binder and water is likely to be poor. As a result, it becomes necessary to increase the amounts of binder and water added or the paste lacks the applicability, so that a uniform electrode layer is difficult to form.

The negative electrode active material for a power storage device according to the present invention can be produced by formulating raw material powders to give the above composition and using the obtained raw material powders to subject them to a melting and rapid cooling process, a sol-gel process, a chemical vapor synthesis process, such as spraying of a mist of their solution into flame, a mechanochemical process or other processes. The negative electrode active material for a power storage device according to the present invention may be any of a glass, a crystallized glass, and a crystal (solid-phase reaction product) which are obtained by the above method. Furthermore, in order to obtain powder of a desired size in the method for producing the negative electrode active material for a power storage device according to the present invention, a general grinder or classifier is used. For example, a mortar, a ball mill, a vibrating ball mill, a satellite ball mill, a planetary ball mill, a jet mill, sieving, centrifugation, air classification or others are used.

The negative electrode active material for a power storage device according to the present invention is preferably coated or mixed with electrically conductive carbon to be given electrical conductivity. By coating the surface of the negative electrode active material with electrically conductive carbon, the electronic conductivity becomes high, so that the rapid charge/discharge characteristics are likely to increase.

Examples of the electrically conductive carbon that can be used include highly electrically conductive carbon blacks, such as acetylene black and Ketjenblack, and graphite and other carbon powder and carbon fibers. Preferred among them is acetylene black because of its high electronic conductivity.

An example of a method for mixing the negative electrode active material and the electrically conductive carbon while grinding them is a method in which a general grinder is used, such as a mortar, a mortar mixer, a ball mill, an attritor, a vibrating ball mill, a satellite ball mill, a planetary ball mill, a jet mill or a bead mill. Among them, a planetary ball mill is preferably used. The planetary ball mill has a structure in which a disk rotates on its axis while pots thereon rotate on their own axises, so that very high impact energy can be efficiently produced to enable homogeneous dispersion of the electrically conductive carbon into the negative electrode active material.

Furthermore, another example of the method for imparting the negative electrode active material electrical conductivity is a method of mixing a negative electrode active material in powder state and an organic compound and then firing the mixture in an inert atmosphere or a reductive atmosphere to carbonize the organic compound, thus coating the surface of the negative electrode active material with the electrically conductive carbon. In this relation, if the firing temperature is too high, crystallization progresses to make the proportion of amorphous phase more likely to decrease. Therefore, the firing temperature is preferably the crystallization temperature of the negative electrode active material or below and particularly preferably (the crystallization temperature minus 30° C.) or below.

Any organic compound may be used as far as it can stay as carbon after being subjected to heat treatment and examples include glucose, citric acid, ascorbic acid, phenolic resin, and a surfactant. Particularly preferred is a surfactant because of its ease of adsorption on the surface of the negative electrode active material. The surfactant may be any of a cationic surfactant, an anionic surfactant, an amphoteric surfactant, and a non-ionic surfactant, but particularly preferred is a non-ionic surfactant because of its excellent adsorbability on the surface of the negative electrode active material.

The content of the electrically conductive carbon is, per 100 parts by mass of negative electrode active material, preferably 0.01 to 20 parts by mass, more preferably 0.03 to 15 parts by mass, still more preferably 0.05 to 12 parts by mass, and particularly preferably 0.07 to 10 parts by mass. If the content of electrically conductive carbon is too small, the negative electrode active material is insufficiently coated and tends to be less electronically conductive. On the other hand, if the carbon content is too large, the proportion of negative electrode active material in the negative electrode material becomes small, so that the discharge capacity is likely to decrease.

The thickness of the electrically conductive carbon coating formed on the surface of the negative electrode active material is preferably 1 to 100 nm and particularly preferably 5 to 80 nm. If the thickness of the electrically conductive carbon coating is too small, the coating may be lost in the charging/discharging process to deteriorate the battery characteristics. On the other hand, if the thickness of the electrically conductive carbon coating is too large, the discharge capacity and operating voltage of the power storage device are likely to decrease.

In the negative electrode active material on the surface of which an electrically conductive carbon coating is formed, the ratio (D/G) of a peak intensity D between 1300 and 1400 cm$^{-1}$ to a peak intensity G between 1550 and 1650 cm$^{-1}$, both measured by Raman spectroscopy, is preferably 1 or less and particularly preferably 0.8 or less, and the ratio (F/G) of a peak intensity F between 800 to 1100 cm$^{-1}$ to the peak intensity G is preferably 0.5 or less and particularly preferably 0.1 or less. Here, the peak intensity G arises from crystalline carbon and the peak intensity D arises from amorphous carbon. Therefore, as the peak intensity ratio D/G is smaller, this means that the electrically conductive carbon coating is more crystalline, and the electronic conductivity tends to be higher. Furthermore, the peak intensity F arises from the components of the negative electrode active material. Therefore, as the peak intensity ratio F/G is smaller, this means that a higher proportion of the surface of the negative electrode active material is covered with crystalline, electrically conductive carbon coating, and the electronic conductivity tends to be higher.

The negative electrode active material for a power storage device according to the present invention has a tapped density of preferably 0.3 g/ml or more and particularly preferably 0.5 g/ml or more. If the tapped density of the negative electrode active material is too small, the electrode density becomes small, so that the discharge capacity per unit volume of the electrode tends to decrease. The upper limit of the tapped density is a value approximately corresponding to the true specific gravity of the negative electrode active material, but is, in consideration of powder aggregation, actually 5 g/ml or less and particularly 4 g/ml or less. Note that in the present invention the tapped density refers to a value measured under conditions of a tapping stroke of 10 mm, a number of taps of 250, and a tapping rate of two taps per second.

The negative electrode active material for a power storage device according to the present invention can be used as a negative electrode material for a power storage device by adding a binder and a conductive aid to make the negative electrode active material into paste form.

The binder is a component to be added to the negative electrode active material in order to bind the negative electrode active material particles together or bind the negative electrode active material and the solid electrolyte to prevent the negative electrode active material from peeling off the negative electrode due to a volume change during charge and discharge. Examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use.

Particularly, carboxymethyl cellulose is most preferred because it is inexpensive and does not need any organic solvent for preparation of a paste having a low environmental burden. These binders may be used singly or in a mixture of two or more of them.

Examples of the conductive aid include highly electrically conductive carbon blacks, such as acetylene black and Ketjenblack, and graphite and other carbon powder and carbon fibers.

Furthermore, the negative electrode active material for a power storage device according to the present invention can also be used as a composite material as an electrode by mixing with a below-described alkali-ion conductive solid electrolyte.

The above negative electrode material for a power storage device can be used as a negative electrode for a power storage device by applying the negative electrode material for a power storage device to the surface of a metal foil or the like serving as a current collector or by using the negative electrode material for a power storage device to form a negative electrode layer and then forming a metal thin film or the like on the surface of the negative electrode layer.

The negative electrode for a power storage device can be used as a power storage device by combining with a separately prepared positive electrode for a power storage device and an electrolyte. An aqueous electrolyte, a nonaqueous electrolyte or a solid electrolyte can be used as the electrolyte.

The aqueous electrolyte is made by dissolving an electrolyte salt in water. When alkali ions to be supplied from the positive electrode are lithium ions, examples of the electrolyte salt include $LiNO_3$, LiOH, LiF, LiCl, LiBr, LiI, $LiClO_4$, $Li_2SO_4$, $CH_3COOLi$, $LiBF_4$, and $LiPF_6$. When the alkali ions are sodium ions, examples of the electrolyte salt include $NaNO_3$, $Na_2SO_4$, NaOH, NaCl, and $CH_3COONa$. When the alkali ions are potassium ions, examples of the electrolyte salt include $KNO_3$, KOH, KF, KCl, KBr, KI, $KClO_4$, $K_2SO_4$, $CH_3COOK$, $KBF_4$, and $KPF_6$. These electrolyte salts may be used singly or in a mixture of two or more of them. The electrolyte salt concentration is appropriately adjusted, generally, within a range of not less than 0.1 M and not more than the saturation concentration.

The nonaqueous electrolyte contains: an organic solvent and/or an ionic liquid both of which are nonaqueous solvents; and an electrolyte salt dissolved in the nonaqueous solvent. Specific examples of the organic solvent, the ionic liquid, and the electrolyte salt are as follows. Note that the characters in [ ] after the below-mentioned compound names indicate abbreviations.

Examples of the organic solvent include propylene carbonate [PC], ethylene carbonate [EC], 1,2-dimethoxyethane [DME], γ-butyrolactone [GBL], tetrahydrofuran [THF], 2-methyltetrahydrofuran [2-MeHF], 1,3-dioxolan, sulfolane, acetonitrile [AN], diethyl carbonate [DEC], dimethyl carbonate [DMC], methylethyl carbonate [MEC], and dipropyl carbonate [DPC] These organic solvents may be used singly or in a mixture of two or more of them. Preferred among them is propylene carbonate because of its excellent low-temperature characteristics.

Examples of the ionic liquid include: aliphatic quaternary ammonium salts, such as N,N,N-trimethyl-N-propyl ammonium bis(trifluoromethanesulfonyl)imide [TMPA-TFSI], N-methyl-N-propylpiperidinium bis(trifluoromethanesulfonyl)imide [PP13-TFSI], N-methyl-N-propylpyrrolidinium bis(trifluoromethanesulfonyl)imide [P13-TFSI], and N-methyl-N-butylpyrrolidinium bis(trifluoromethanesulfonyl)imide [P14-TFSI]; and quaternary alkylimidazolium salts, such as 1-methyl-3-ethylimidazolium tetrafluoroborate [EMIBF4], 1-methyl-3-ethylimidazolium bis(trifluoromethanesulfonyl)imide [EMITFSI], 1-allyl-3-ethylimidazolium bromide [AEImBr], 1-allyl-3-ethylimidazolium tetrafluoroborate [AEImBF4], 1-allyl-3-ethylimidazoliumbis(trifluoromethanesulfonyl)imide [AEImTFSI], 1,3-diallylimidazolium bromide [AAImBr], 1,3-diallylimidazolium tetrafluoroborate [AAImBF4], and 1,3-diallylimidazolium bis(trifluoromethanesulfonyl)imide [AAImTFSI].

Examples of the electrolyte salt include lithium salts, sodium salts, and potassium salts of $PF_6^-$, $BF_4^-$, $(CF_3SO_2)_2N^-$ [TFSI], $CF_3SO_3^-$ [TFS], $(C_2F_5SO_2)_2N^-$ [BETI], $ClO_4^-$, $AsF_6^-$, $SbF_6^-$, $B(C_2O_4)_2^-$ [BOB], $BF_2OCOOC(CF_3)_3^-$ [B(HHIB)], and so on. These electrolyte salts may be used singly or in a mixture of two or more of them. Particularly preferred are lithium salts, sodium salts, and potassium salts of $PF_6^-$ and $BF_4^-$, which are inexpensive. The electrolyte salt concentration is appropriately adjusted, generally, within a range of not less than 0.5 M and not more than 3 M.

The nonaqueous electrolyte may contain an additive, such as vinylene carbonate [VC], vinylene acetate [VA], vinylene butyrate, vinylene hexanoate, vinylene crotonate or catechol carbonate. These additives serve to form a protective film ($LiCO_x$ or the like) on the surface of the negative electrode active material. The amount of additive is, per 100 parts by mass of nonaqueous electrolyte, preferably 0.1 to 3 parts by mass and particularly preferably 0.5 to 1 part by mass. If the amount of additive is too small, the above effect is less likely to be achieved. On the other hand, even if the amount of additive is too large, further improvement in the above effect is less likely to be achieved.

When alkali ions supplied from the positive electrode to the negative electrode are lithium ions, examples of the solid electrolyte include lithium R-alumina, lithium β-alumina, $Li_2S$—$P_2S_5$ glass or crystallized glass, $Li_{1+x}Al_xGe_{2-x}(PO_4)_3$ crystal or crystallized glass, $Li_{14}Al_{0.4}(Ge_{2-x}Ti_x)_{1.6}(PO_4)_3$ crystal or crystallized glass, $Li_3La_{2/3-x}TiO_3$ crystal or crystallized glass, $Li_{0.8}La_{0.6}Zr_2(PO_4)_3$ crystal or crystallized glass, $Li_{1+x}Ti_{2-x}Al_x(PO_4)_3$ crystal or crystallized glass, $Li_{1+x+y}Ti_{2-x}Al_xSi_y(PO_4)_{3-y}$ crystal or crystallized glass, and $LiTi_xZr_{2-x}(PO_4)_3$ crystal or crystallized glass. When the alkali ions are sodium ions, examples of the solid electrolyte include sodium β-alumina, sodium β-alumina, $Na_{1+x}Zr_2Si_xP_{3-x}O_{12}$ crystal or crystallized glass, $Na_{3.12}Si_2Zr_{1.88}Y_{0.12}PO_{12}$ crystal or crystallized glass, and $Na_{5.9}Sm_{0.6}Al_{0.1}P_{0.3}Si_{3.6}O_9$ crystallized glass. When the alkali ions are potassium ions, examples of the electrolyte salt include potassium β-alumina and potassium β-alumina.

Among the above electrolytes, nonaqueous electrolytes and solid electrolytes are preferred because of their wide potential windows. Particularly, solid electrolytes having alkali-ion conductivity have wide potential windows and, therefore, produce little gas due to electrolyte decomposition during charge and discharge, so that the safety of the power storage device can be increased.

In a power storage device based on an electrolytic solution in which an aqueous electrolyte or a nonaqueous electrolyte is used, a separator is preferably provided between the electrodes. The separator is made of a material having insulation properties and specific examples of the material that can be used include porous film or non-woven fabric obtained from a polymer, such as polyolefin, cellulose, polyethylene terephthalate or vinylon; non-woven glass fabric containing glass fibers; glass cloth in which glass fibers are woven; and film-like glass.

The type of positive electrode active material for use in the positive electrode is not particularly limited and can be appropriately selected depending on the type or so on of the desired power storage device. For example, in a sodium-ion secondary battery, examples of the positive electrode active material include $NaFeO_2$, $NaNiO_2$, $NaCoO_2$, $NaMnO_2$, $NaVO_2$, $Na(Ni_xMn_{1-x})O_2$, $Na(Fe_xMn_{1-x})O_2$ (where $0<x<1$), $NaVPO_4$, $Na_2FeP_2O_7$, and $Na_3V_2(PO_4)_3$. In a lithium-ion secondary battery, examples of the positive electrode active material include $LiCoO_2$, $LiNiO_2$, $LiCo_{1/3}Ni_{1/3}Mn_{1/3}O_2$, $LiVO_2$, $LiCrO_2$, $LiMn_2O_4$, $LiFePO_4$, and $LiMnPO_4$.

After a power storage device in which the negative electrode active material for a power storage device according to the present invention is used is charged and discharged, the negative electrode active material may contain an oxide of lithium, sodium or potassium, an oxide containing $Nb^{5+}$, $Nb^{4+}$, $Nb^{3+}$ or $Nb^{2+}$, or like substances. For example, the negative electrode active material for a power storage device according to the present invention contains, in terms of % by mole of oxide, 5 to 90% $Nb_2O_5$, 1 to 80% $Li_2O+Na_2O+K_2O$, and 5 to 85% $SiO_2+B_2O_3+P_2O_5+Al_2O_5$ at the completion of discharge. Here, in the sodium-ion secondary battery, the term "at the completion of discharge" refers to a state where, in a test cell in which the negative electrode active material for a power storage device according to the present invention is used as a negative electrode, metallic sodium is used as a positive electrode, and a 1M $NaPF_6$ solution/EC:DEC=1:1 is used as an electrolytic solution, the cell has been charged at a constant current of 0.1 C rate to 0.7 V (vs. $Na^+/Na$) and then discharged at a constant current of 0.1 C rate to 2.5 V. Furthermore, in the lithium-ion secondary battery, the term "at the completion of discharge" refers to a state where, in a test cell in which the negative electrode active material for a power storage device according to the present invention is used as a negative electrode, metallic lithium is used as a positive electrode, and a 1M $NaPF_6$ solution/EC:DEC=1:1 is used as an electrolytic solution, the cell has been charged at a constant current of 0.1 C rate to 1.4 V (vs. $Li^+/Li$) and then discharged at a constant current of 0.1 C rate to 3.2 V.

Although the description has heretofore been given mainly of the case where the power storage device is an alkali-ion secondary battery, such as a lithium-ion secondary battery or a sodium-ion secondary battery, the present invention is not limited to them and is also applicable to, for example, a hybrid capacitor in which a negative electrode active material for use in a lithium-ion secondary battery, a sodium-ion secondary battery or like battery is combined with a positive electrode material for a nonaqueous electric double layer capacitor.

Each of a lithium-ion capacitor and a sodium-ion capacitor which are hybrid capacitors is a type of asymmetric capacitor having different charge/discharge principles between the positive and negative electrodes. The lithium-ion capacitor has a structure in which a negative electrode for a lithium-ion secondary battery is combined with a positive electrode for an electric double layer capacitor. The sodium-ion capacitor has a structure in which a negative electrode for a sodium-ion secondary battery is combined with a positive electrode for an electric double layer capacitor. In these cases, the positive electrode has an electric double layer formed on the surface thereof and is charged and discharged using a physical action (electrostatic action), while the negative electrode is charged and discharged, like the previously described lithium-ion secondary battery or sodium-ion secondary battery, by a chemical reaction (insertion and extraction) of lithium ions or sodium ions.

For the positive electrodes of the lithium-ion capacitor and the sodium-ion capacitor, a positive electrode active material is used which is made of, for example, carbonaceous powder having a high specific surface area, such as activated charcoal, polyacene or mesophase carbon. On the other hand, for the negative electrodes thereof, the negative electrode active material according to the present invention can be used.

When the negative electrode active material according to the present invention is used in the lithium-ion capacitor or the sodium-ion capacitor, it is necessary to previously insert lithium ions or sodium ions and electrons in the negative electrode active material. The means for implementing this is not particularly limited. For example, a metallic lithium electrode or a metallic sodium electrode, which serves as a supply source of lithium ions or sodium ions and electrons, may be placed in a capacitor cell and brought into contact directly or through a conductor with a negative electrode containing the negative electrode active material according to the present invention. Alternatively, after previously inserting lithium ions or sodium ions and electrons in the negative electrode active material according to the present invention in a separate cell, the negative-electrode active material may be incorporated into a capacitor cell.

EXAMPLES

Hereinafter, a description will be given, as examples of the negative electrode active material for a power storage device according to the present invention, of working examples applied to secondary batteries in which a non-aqueous electrolyte or a solid electrolyte is used, but the present invention is not limited to these working examples.

Secondary Battery Using Nonaqueous Electrolyte

Tables 1 to 7 show working examples (Nos. 1 to 33) of the present invention and comparative examples (Nos. 34 and 35).

TABLE 1

|  |  | 1 | 2 | 3 | 4 | 5 | 6 |
|---|---|---|---|---|---|---|---|
| Composition (% by mole) | $Li_2O$ |  |  |  |  |  |  |
|  | $Na_2O$ | 25 | 37.5 | 50 | 30 | 45 | 45 |
|  | $K_2O$ |  |  |  |  |  |  |
|  | $Nb_2O_5$ | 45 | 25 | 25 | 30 | 15 | 10 |
|  | $TiO_2$ |  |  |  |  |  |  |
|  | $P_2O_5$ | 30 | 37.5 | 25 | 40 | 40 | 45 |
|  | $SiO_2$ |  |  |  |  |  |  |
|  | $B_2O_5$ |  |  |  |  |  |  |
| $Nb_2O_5/(P_2O_5 + B_2O_3 + SiO_2 + Al_2O_3)$ | | 1.50 | 0.67 | 1.00 | 0.75 | 0.38 | 0.22 |
| $(R_2O + R'O)/(P_2O_5 + B_2O_3 + SiO_2 - Al_2O_3)$ | | 0.83 | 1.00 | 2.00 | 0.75 | 1.13 | 1.00 |
| Crystalline Phase Content (% by mass) | | 0 | 0 | 40 | 0 | 0 | 0 |
| Amorphous Phase Content (% by mass) | | 100 | 100 | 60 | 100 | 100 | 100 |
| Type of Precipitated Crystal | |  |  |  | $NaNbO_3$ |  |  |
| NIB Battery Characteristics | Discharge Capacity (mAh/g) | 149 | 92.5 | 84 | 101.7 | 63.6 | 48.3 |
|  | Discharge Voltage (V) | 1.72 | 1.56 | 1.13 | 1.74 | 1.54 | 1.63 |
|  | First Charge/Discharge Efficiency (%) | 86 | 82 | 82 | 84 | 92 | 94 |
|  | Discharge Capacity Retention (%) | 77 | 87 | 86 | 87 | 88 | 89 |
| LIB Battery Characteristics | Discharge Capacity (mAh/g) | 134.3 | 92.9 | 94.8 | 92.3 | 64.0 | 44.8 |
|  | Discharge Voltage (V) | 1.93 | 1.84 | 1.44 | 2.09 | 1.84 | 1.95 |
|  | First Charge/Discharge Efficiency (%) | 93 | 83 | 83 | 85 | 93 | 95 |
|  | Discharge Capacity Retention (%) | 79 | 88 | 87 | 90 | 93 | 92 |

TABLE 2

|  |  | 7 | 8 | 9 | 10 | 11 | 12 |
|---|---|---|---|---|---|---|---|
| Composition (% by mole) | $Li_2O$ |  |  |  |  |  |  |
|  | $Na_2O$ |  |  |  |  |  |  |
|  | $K_2O$ | 10 | 27.2 | 27.0 | 23 | 40.3 | 50 |
|  | $Nb_2O_5$ | 60 | 45.7 | 42.3 | 40 | 19.4 | 25 |
|  | $TiO_2$ |  |  |  |  |  |  |
|  | $P_2O_5$ | 20 | 21.7 | 30.7 | 37 | 32.2 | 25 |
|  | $SiO_2$ |  |  |  |  |  |  |
|  | $B_2O_5$ |  | 5.4 |  |  | 8.1 |  |
|  | BaO | 10 |  |  |  |  |  |
| $Nb_2O_5/(P_2O_5 + B_2O_3 + SiO_2 + Al_2O_3)$ | | 3.00 | 1.68 | 1.38 | 1.08 | 0.48 | 1.00 |
| $(R_2O + R'O)/(P_2O_5 + B_2O_3 + SiO_2 + Al_2O_3)$ | | 1.00 | 1.25 | 0.88 | 0.62 | 1.25 | 2.00 |
| Crystalline Phase Content (% by mass) | | 0 | 0 | 0 | 0 | 0 | 0 |
| Amorphous Phase Content (% by mass) | | 100 | 100 | 100 | 100 | 100 | 100 |
| Type of Precipitated Crystal | |  |  |  |  |  |  |
| NIB Battery Characteristics | Discharge Capacity (mAh/g) | 149 | 132.8 | 123 | 116.8 | 71.8 | 87.9 |
|  | Discharge Voltage (V) | 1.75 | 1.43 | 1.61 | 1.73 | 1.43 | 1.13 |
|  | First Charge/Discharge Efficiency (%) | 80 | 85 | 84 | 80 | 86 | 87 |
|  | Discharge Capacity Retention (%) | 77 | 82 | 84 | 85 | 88 | 86 |
| LIB Battery Characteristics | Discharge Capacity (mAh/g) | 143 | 126.8 | 117 | 110.8 | 65.8 | 81.9 |
|  | Discharge Voltage (V) | 1.96 | 1.74 | 1.82 | 2.04 | 1.84 | 1.54 |
|  | First Charge/Discharge Efficiency (%) | 80.5 | 88 | 87 | 82 | 89 | 89 |
|  | Discharge Capacity Retention (%) | 79 | 84 | 86 | 87 | 90 | 88 |

TABLE 3

|  |  | 13 | 14 | 15 | 16 | 17 |
|---|---|---|---|---|---|---|
| Composition (% by mole) | $Li_2O$ |  |  |  | 12.6 | 20 |
|  | $Na_2O$ |  | 21 | 31 | 20.6 | 11 |
|  | $K_2O$ | 7 |  |  | 1.2 | 2 |
|  | $Nb_2O_5$ | 32.5 | 32 | 28.5 | 21.5 | 19 |
|  | $P_2O_5$ | 14.5 | 30 | 27 | 24.2 | 24 |
|  | $SiO_2$ | 1.5 | 2 |  |  |  |
|  | $B_2O_5$ | 17.5 | 1 | 8.5 | 5.8 | 4 |
|  | $Bi_2O_3$ |  |  | 3 | 3.8 | 2 |
|  | $TiO_2$ |  |  |  |  | 5 |
|  | $TeO_2$ |  |  |  |  |  |
|  | $Al_2O_3$ |  |  |  |  |  |
|  | BaO | 24 | 14 | 2 | 5.7 | 3 |
|  | $WO_3$ | 3 |  |  | 4.6 | 8 |
|  | ZnO |  |  |  |  | 2 |
| $Nb_2O_5/(P_2O_5 + B_2O_3 + SiO_2 + Al_2O_3)$ | | 0.97 | 0.97 | 0.80 | 0.72 | 0.68 |
| $(R_2O + R'O)/(P_2O_5 + B_2O_3 + SiO_2 + Al_2O_3)$ | | 0.93 | 1.06 | 0.93 | 1.34 | 1.36 |
| Crystalline Phase Content (% by mass) | | 0 | 0 | 0 | 0 | 0 |
| Amorphous Phase Content (% by mass) | | 100 | 100 | 100 | 100 | 100 |
| Type of Precipitated Crystal | |  |  |  |  |  |
| NIB Battery Characteristics | Discharge Capacity (mAh/g) | 96 | 104.3 | 114.2 | 115.4 | 102.2 |
|  | Discharge Voltage (V) | 1.76 | 1.73 | 1.61 | 1.48 | 1.46 |
|  | First Charge/Discharge Efficiency (%) | 78 | 80 | 81 | 83 | 83 |
|  | Discharge Capacity Retention (%) | 80 | 80 | 80 | 81 | 81 |
| LIB Battery Characteristics | Discharge Capacity (mAh/g) | 100 | 104.3 | 121.2 | 115.4 | 97.2 |
|  | Discharge Voltage (V) | 1.97 | 2.03 | 1.91 | 1.78 | 1.76 |
|  | First Charge/Discharge Efficiency (%) | 79 | 80 | 79 | 82 | 83 |
|  | Discharge Capacity Retention (%) | 83 | 83 | 83 | 84 | 84 |

TABLE 4

|  |  | 18 | 19 | 20 | 21 | 22 |
|---|---|---|---|---|---|---|
| Composition (% by mole) | $Li_2O$ |  |  |  |  |  |
|  | $Na_2O$ |  |  |  |  |  |
|  | $K_2O$ |  |  |  |  |  |
|  | $Nb_2O_5$ | 81 | 47.5 | 20 | 18 | 10 |
|  | $P_2O_5$ |  |  | 80 | 72 |  |
|  | $SiO_2$ | 19 | 52.5 |  |  |  |
|  | $B_2O_5$ |  |  |  |  | 80 |
|  | $TiO_2$ |  |  |  |  |  |
|  | $TeO_2$ |  |  |  |  | 10 |
|  | $Al_2O_3$ |  |  |  |  |  |
|  | BaO |  |  |  | 10 |  |
|  | ZnO |  |  |  |  |  |
| $Nb_2O_5/(P_2O_5 + B_2O_3 + SiO_2 + Al_2O_3)$ | | 4.29 | 0.90 | 0.25 | 0.25 | 0.13 |
| $(R_2O + R'O)/(P_2O_5 + B_2O_3 + SiO_2 + Al_2O_3)$ | | 0.00 | 0.00 | 0.00 | 0.14 | 0.00 |
| Crystalline Phase Content (% by mass) | | 0 | 0 | 0 | 0 | 0 |
| Amorphous Phase Content (% by mass) | | 100 | 100 | 100 | 100 | 100 |
| Type of Precipitated Crystal | |  |  |  |  |  |
| NIB Battery Characteristics | Discharge Capacity (mAh/g) | 132 | 129.3 | 41.3 | 46.3 | 54.1 |
|  | Discharge Voltage (V) | 1.78 | 2.05 | 2.05 | 2.10 | 2.12 |
|  | First Charge/Discharge Efficiency (%) | 59 | 70 | 70 | 70 | 73 |
|  | Discharge Capacity Retention (%) | 65 | 80 | 83 | 83 | 83 |
| LIB Battery Characteristics | Discharge Capacity (mAh/g) | 179 | 150.3 | 55.3 | 46.5 | 51.9 |
|  | Discharge Voltage (V) | 2.19 | 2.38 | 2.59 | 2.63 | 2.71 |
|  | First Charge/Discharge Efficiency (%) | 60 | 70 | 68 | 69 | 73 |
|  | Discharge Capacity Retention (%) | 67 | 80 | 84 | 84 | 84 |

TABLE 5

|  |  | 23 | 24 | 25 | 26 |
|---|---|---|---|---|---|
| Composition (% by mole) | $Li_2O$ |  |  |  |  |
|  | $Na_2O$ | 25 | 37.5 |  |  |
|  | $K_2O$ |  |  | 40 | 40 |
|  | $Nb_2O_5$ | 45 | 25 | 40 | 40 |
|  | $TiO_2$ | 30 | 37.5 |  |  |

TABLE 5-continued

|  |  | 23 | 24 | 25 | 26 |
|---|---|---|---|---|---|
| | $P_2O_5$ | | | | |
| | $SiO_2$ | | | 20 | 20 |
| | $B_2O_5$ | | | | |
| $Nb_2O_5/(P_2O_5 + B_2O_3 + SiO_2 + Al_2O_3)$ | | 1.50 | 0.67 | 2.00 | 2.00 |
| $(R_2O + R'O)/(P_2O_5 + B_2O_3 + SiO_2 + Al_2O_3)$ | | 0.83 | 1.00 | 2.00 | 2.00 |
| Heat Treatment Temperature (° C.) | | 850 | 800 | 700 | 800 |
| Crystalline Phase Content (% by mass) | | 72 | 51 | 71 | 98 |
| Amorphous Phase Content (% by mass) | | 28 | 49 | 29 | 2 |
| Type of Precipitated Crystal | | $Na_{3.04}Nb_7P_4O_{29}$ | $NbPO_5$ | $K_3Nb_8O_{21}$ | $KNbO_3$ |
| | | $Na_2Nb_6P_4O_{26}$ | $NaNb_3O_8$ | $SiO_2$ | $K_3Nb_3O_6Si_2O_7$ |
| | | $NaNbO_3$ | | $K_4Nb_6O_{17}$ | $K_4Nb_6O_{17}$ |
| | | $Na_4Nb_8P_4O_{32}$ | | $KNb_{3.76}O_6$ | $K_3NbO_4$ |
| | | $Nb_2O_5$ | | $NbO_2$ | $KNb_8O_{14}$ |
| | | | | $K_3Nb_7O_{19}$ | $Nb_2O_5$ |
| | | | | | $K_3Nb_7O_{19}$ |
| NIB Battery Characteristics | Discharge Capacity (mAh/g) | 107 | 138.2 | 43.0 | 76.0 |
| | Discharge Voltage (V) | 1.44 | 1.19 | 0.95 | 0.71 |
| | First Charge/Discharge Efficiency (%) | 67 | 46 | 56 | 49 |
| | Discharge Capacity Retention (%) | 72 | 81 | 71 | 67 |

TABLE 6

|  |  | 27 | 28 | 29 | 30 | 31 | 32 | 33 |
|---|---|---|---|---|---|---|---|---|
| Composition (% by mole) | $Li_2O$ | | | | | | | |
| | $Na_2O$ | 20 | 20 | | | | | |
| | $K_2O$ | | | 45 | | | | |
| | MgO | | | | 37 | | | |
| | CaO | | | | | 31 | 37 | |
| | SrO | | | | | | | 24 |
| | BaO | | | | | | | 8 |
| | $Nb_2O_5$ | 30 | 15 | 35 | 12 | 55 | 23 | 32 |
| | $TiO_2$ | 15 | 30 | | | | | |
| | $P_2O_5$ | 30 | 30 | | | | 33 | |
| | $SiO_2$ | | | | 37 | 14 | | |
| | $B_2O_5$ | | | | | | 7 | 36 |
| | $Al_2O_3$ | 5 | 5 | 20 | 14 | | | |
| $Nb_2O_5/(P_2O_5 + B_2O_3 + SiO_2 + Al_2O_3)$ | | 0.86 | 0.43 | 1.75 | 0.24 | 3.93 | 0.58 | 0.89 |
| $(R_2O + R'O)/(P_2O_5 + B_2O_3 + SiO_2 + Al_2O_3)$ | | 0.57 | 0.57 | 2.25 | 0.73 | 2.21 | 0.93 | 0.89 |
| Heat Treatment Temperature (° C.) | | 550 | 550 | 550 | 550 | 550 | 550 | 550 |
| Crystalline Phase Content (% by mass) | | 0 | 0 | 0 | 0 | 0 | 0 | 0 |
| Amorphous Phase Content (% by mass) | | 100 | 100 | 100 | 100 | 100 | 100 | 100 |
| Type of Precipitated Crystal | | | | | | | | |
| NIB Battery Characteristics | Discharge Capacity (mAh/g) | 164 | 142 | 116 | 128 | 91 | 114 | 144 |
| | Discharge Voltage (V) | 1.47 | 1.42 | 0.92 | 1.08 | 0.93 | 1.28 | 1.09 |
| | First Charge/Discharge Efficiency (%) | 78 | 78 | 44 | 72 | 44 | 66 | 67 |
| | Discharge Capacity Retention (%) | 84 | 90 | 93 | 93 | 93 | 95 | 89 |

TABLE 7

|  |  | 34 | 35 |
|---|---|---|---|
| Composition (% by mole) | $Li_2O$ | | |
| | $Na_2O$ | | |
| | $K_2O$ | | 25 |
| | $Nb_2O_5$ | 100 | 75 |
| | $P_2O_5$ | | |
| | $SiO_2$ | | |
| | $B_2O_5$ | | |
| | $TiO_2$ | | |
| | $TeO_2$ | | |
| | $Al_2O_3$ | | |
| | BaO | | |
| | ZnO | | |
| $Nb_2O_5/(P_2O_5 + B_2O_3 + SiO_2 + Al_2O_3)$ | | — | — |
| $(R_2O + R'O)/(P_2O_5 + B_2O_3 + SiO_2 + Al_2O_3)$ | | — | — |
| Crystalline Phase Content (% by mass) | | 100 | 100 |
| Amorphous Phase Content (% by mass) | | 0 | 0 |
| Type of Precipitated Crystal | | $Nb_2O_5$ | $KNb_3O_8$ |
| NIB Battery | Discharge Capacity (mAh/g) | 73.0 | 104.0 |
| | Discharge Voltage (V) | 1.01 | 0.95 |
| Characteristics | First Charge/Discharge Efficiency (%) | 36 | 53 |
| | Discharge Capacity Retention (%) | 23 | 19 |
| LIB Battery | Discharge Capacity (mAh/g) | 169.0 | 105.4 |
| | Discharge Voltage (V) | 1.78 | 1.65 |
| Characteristics | First Charge/Discharge Efficiency (%) | 93 | 75 |
| | Discharge Capacity Retention (%) | 56 | 61 |

(1) Production of Negative Electrode Active Material

Samples Nos. 1 to 33 and 35 were produced in the following manner. Using various oxides, carbonates, and so on as raw materials, powders of the raw materials were formulated to give each composition described in the tables. The powders of raw materials were loaded into a platinum crucible and melted at 1200 to 1500° C. for 60 minutes in an air atmosphere using an electric furnace.

Next, resultant molten glass was poured between a pair of rotating rollers and formed into a shape with rapid cooling, thus obtaining a film-like melt-solidified body having a thickness of 0.1 to 2 mm. The melt-solidified body was ground with a ball mill and then air-classified to obtain powder (negative electrode active material precursor powder) having an average particle size of 2 μm. The obtained powder samples were subjected to powder X-ray diffraction measurement to identify their crystal structures. Samples Nos. 1 to 33 were confirmed to be amorphous. On the other hand, a $KNb_3O_8$ crystal was detected from sample No. 35.

As for Nos. 1 to 3, 23 to 33, and 35, an amount of 100 parts by mass of obtained powder was fully mixed with 21.4 parts by mass (corresponding to 12 parts by mass in carbon terms) of polyethylene oxide nonylphenyl ether (having an HLB value of 13.3 and a weight average molecular weight of 660), which is a non-ionic surfactant, as a carbon source and 10 parts by mass of ethanol, followed by drying at 100° C. for about an hour. Thereafter, the mixture was fired in a nitrogen atmosphere at 650° C. for an hour as for Nos. 1 to 3 and 35 or fired in a nitrogen atmosphere at a temperature described in Tables 5 or 6 for an hour as for Nos. 23 to 33, thus obtaining negative electrode active material powder the surface of which was coated with carbon. The obtained negative electrode active material powder products were subjected to powder X-ray diffraction measurement to identify their crystal structures. The negative electrode active material powder products from samples Nos. 1, 2, and 27 to 33 remained amorphous, but the negative electrode active material powder products from samples Nos. 3 and 23 to 26 were confirmed to exhibit not only an amorphous halo but also diffraction lines arising from crystals described in the tables. As for sample No. 35, no amorphous halo was confirmed, but crystalline diffraction lines arising from $KNb_3O_8$ were confirmed. The crystalline phase content was determined by the previously described method.

As for Nos. 4 to 22, 10.5 parts by mass of acetylene black (DENKA BLACK) as a conductive aid was added to 89.5 parts by mass of obtained powder and these components were mixed at 300 rpm for 150 minutes using a planetary ball mill P6 manufactured by Fritsch GmbH, thus obtaining negative electrode active material powder coated with carbon. The obtained negative electrode active material powder products were subjected to powder X-ray diffraction measurement to identify their crystal structures. From these negative electrode active material powder products, an amorphous halo was detected, but no crystalline diffraction line was detected.

As for sample No. 34, $Nb_2O_5$ powder (manufactured by Mitsui Mining & Smelting Co., Ltd. and having an average particle size of 1 μm) was used as it was as a negative electrode active material.

(2) Production of Negative Electrode

Electrically conductive carbon black (SUPER C65 manufactured by TIMCAL) as a conductive aid and poly(vinylidene fluoride) as a binder were weighed and mixed with the carbon-coated negative electrode active material powder obtained in the above manner to reach a ratio of negative electrode active material powder to conductive aid to binder of 85:5:10 (mass ratio) and the mixture was dispersed into N-methylpyrrolidinone (NMP), followed by fully stirring with a planetary centrifugal mixer to form a slurry, thus obtaining a negative electrode material.

Next, the obtained slurry was coated on a 20-μm thick copper foil serving as a negative electrode current collector using a doctor blade with a gap of 125 μm, and the negative electrode material coated on the copper foil was vacuum-dried by a dryer at 70° C. and then pressed by passing it between a pair of rotating rollers to obtain an electrode sheet. This electrode sheet was punched out into an 11-mm diameter disc by an electrode punching machine and the disc was dried at a temperature of 150° C. for eight hours under reduced pressure, thereby obtaining a circular negative electrode.

(3) Production of Test Cell

A test cell for a sodium-ion secondary battery (NIB) was produced in the following manner. The negative electrode obtained in the above manner was placed, with its copper foil surface down, on top of a lower lid of a coin cell, a separator formed of a 16-mm diameter polypropylene porous film dried at 70° C. for eight hours under reduced pressure and a metallic sodium layer as a counter electrode were laminated on the negative electrode, and the laminate was then capped with an upper lid of the coin cell, thus producing a test cell. A 1M $NaPF_6$ solution/EC:DEC=1:1 (where EC is ethylene carbonate and DEC is diethyl carbonate) was used as an electrolytic solution. The assembly of the test cell was conducted in an environment of the dew-point temperature minus 70° C. or below.

A test cell for a lithium-ion secondary battery (LIB) was produced in the following manner. The negative electrode obtained in the above manner was placed, with its copper foil surface down, on top of a lower lid of a coin cell, a separator formed of a 16-mm diameter polypropylene porous film dried at 70° C. for eight hours under reduced pressure and a metallic lithium layer as a counter electrode were laminated on the negative electrode, and the laminate was then capped with an upper lid of the coin cell, thus producing a test cell. A 1M $LiPF_6$ solution/EC:DEC=1:1 was used as an electrolytic solution. The assembly of the test cell was conducted in an environment of the dew-point temperature minus 50° C. or below.

(4) Charge and Discharge Test

Test cells Nos. 1 to 22 for sodium-ion secondary batteries were CC (constant-current) charged at 30° C. from an open circuit voltage to 0.7 V (vs. Na/Na$^+$) and their amounts of electricity charged to the negative electrode active material per unit mass (first charge capacities) were determined. Next, the test cells were CC discharged from 0.7 V to 2.5 V and their amounts of electricity discharged from the negative electrode active material per unit mass (first discharge capacities) were determined.

Test cells Nos. 23 to 33 for sodium-ion secondary batteries were CC charged at 30° C. from an open circuit voltage to 0.4 V (vs. Na/Na$^+$) and their amounts of electricity charged to the negative electrode active material per unit mass (first charge capacities) were determined. Next, the test cells were CC discharged from 0.4 V to 2.2 V and their amounts of electricity discharged from the negative electrode active material per unit mass (first discharge capacities) were determined.

Test cells Nos. 34 and 35 for sodium-ion secondary batteries were CC charged at 30° C. from an open circuit voltage to 0.2 V (vs. Na/Na$^+$) and their amounts of electricity charged to the negative electrode active material per unit mass (first charge capacities) were determined. Next, the test cells were CC discharged from 0.2 V to 2.0 V and their amounts of electricity discharged from the negative electrode active material per unit mass (first discharge capacities) were determined.

Test cells Nos. 1 to 22 for lithium-ion secondary batteries were CC charged at 30° C. from an open circuit voltage to 1.4 V (vs. Li/Li$^+$) and their amounts of electricity charged to the negative electrode active material per unit mass (first charge capacities) were determined. Next, the test cells were CC discharged from 1.4 V to 3.2 V and their amounts of electricity discharged from the negative electrode active material per unit mass (first discharge capacities) were determined.

lithium-ion secondary batteries was as small as 1.78 V or less, but the discharge capacity retention in each of the test cells for sodium-ion secondary batteries and the discharge capacity retention in each of the test cells for lithium-ion secondary batteries were 23% or less and 61% or less, respectively, which were poor as compared to the working examples.

Sodium-Ion Secondary Battery Using Solid Electrolyte

Table 8 shows working examples (Nos. 36 to 38) of the present invention.

TABLE 8

|  |  | 36 | 37 | 38 |
|---|---|---|---|---|
| Negative Electrode Material (% by mass) | Active Material Precursor | 76 | 76 | 76 |
|  | Solid Electrolyte β"-Alumina | 21 | 21 | — |
|  | (Stabilizing Agent) | (Li$_2$O) | (MgO) |  |
|  | NASICON Crystal | — | — | 21 |
|  | Electrically Conductive Carbon | 3 | 3 | 3 |
| Solid Electrolyte |  | Li$_2$O-stabilized β"-alumina | MgO-stabilized β"-alumina | NASICON crystal |
| Battery Characteristics | Discharge Capacity (mAh/g) | 43 | 48 | 40 |
|  | Discharge Voltage (V) | 1.13 | 1.1 | 1.29 |
|  | First Charge/Discharge Efficiency (%) | 94 | 92 | 92 |
|  | Discharge Capacity Retention (%) | 98 | 100 | 98 |

Test cells Nos. 34 and 35 for lithium-ion secondary batteries were CC charged at 30° C. from an open circuit voltage to 1.2 V and their amounts of electricity charged to the negative electrode active material per unit mass (first charge capacities) were determined. Next, the test cells were CC discharged from 1.2 V to 3.0 V and their amounts of electricity discharged from the negative electrode active material per unit mass (first discharge capacities) were determined.

The C rate was 0.1 C in each case. Furthermore, in each case, the voltage difference between at the completion of charge and at the completion of discharge was standardized at 1.8 V so that the same conditions were provided among Nos. 1 to 22, among Nos. 23 to 33, and between Nos. 34 and 35.

The results of the charge and discharge characteristics are shown in Tables 1 to 7. Furthermore, the first charge/discharge curves of the test cells for sodium-ion secondary batteries using samples Nos. 1 to 3, 34, and 35 are shown in FIGS. 1 to 5, respectively. In the tables, "Discharge Capacity" refers to the first discharge capacity, "Discharge Voltage" refers to the average voltage during the first discharge, "First Charge/Discharge Efficiency" refers to the rate of the first discharge capacity to the first charge capacity, and "Discharge Capacity Retention" refers to the rate of the 50th cycle discharge capacity to the first discharge capacity.

As is obvious from Tables 1 to 7 and FIGS. 1 to 5, as for Nos. 1 to 33 which are working examples, the discharge voltage and discharge capacity retention in each of the test cells for sodium-ion secondary batteries were 2.12 V or less and 65% or more, respectively, the discharge voltage and discharge capacity retention in each of the test cells for lithium-ion secondary batteries were 2.71 V or less and 67% or more, respectively, and the working examples were therefore excellent in these characteristics. On the other hand, as for samples Nos. 34 and 35 which are comparative examples, the discharge voltage in each of the test cells for sodium-ion secondary batteries was as small as 1.01 V or less, and the discharge voltage in each of the test cells for (1) Preparation of Negative Electrode Active Material Precursor Powder Sodium metaphosphate (NaPO$_3$), niobium pentoxide (Nb$_2$O$_5$), and sodium carbonate (Na$_2$CO$_3$) were used as raw materials, powders of these raw materials were formulated to give a composition of, in % by mole, 50% Na$_2$O, 25% Nb$_2$O$_5$, and 25% P$_2$O$_5$, and the mixture was melted in an air atmosphere at 1250° C. for 45 minutes. Thereafter, resultant molten glass was poured between a pair of rotating rollers and formed into a shape with rapid cooling, thus obtaining film-like glass having a thickness of 0.1 to 1 mm. This film-like glass was ground for five hours with a ball mill using a 20-mm diameter ZrO$_2$ ball and the ground product was passed through a resin-made sieve with 120-μm openings to obtain coarse glass powder having an average particle size of 3 to 15 μm. Next, the coarse glass powder was ground, using ethanol as a grinding aid, for 80 hours with a ball mill using a 3-mm diameter ZrO$_2$ ball, thus obtaining glass powder (negative electrode active material precursor powder) having an average particle size of 0.7 μm. As a result of powder X-ray diffraction (XRD) measurement, only an amorphous halo was detected from the glass powder and no crystalline diffraction line was confirmed from the glass powder.

(2) Preparation of Sodium-Ion Conductive Solid Electrolyte (Li$_2$O-Stabilized β" Alumina)

A Li$_2$O-stabilized β" alumina having a composition formula of Na$_{1.6}$Li$_{0.34}$Al$_{0.66}$O$_{17}$ (manufactured by Ionotec Ltd.) was processed by dry grinding to a thickness of 0.2 mm, thus obtaining a solid electrolyte sheet. Furthermore, solid electrolyte powder (having an average particle size of 13 μm) was separately prepared by grinding the obtained solid electrolyte sheet with a planetary ball mill and passing the ground product through a sieve with 10-μm openings.

(MgO-Stabilized β"-Alumina)

Sodium carbonate (Na$_2$CO$_3$), aluminum oxide (Al$_2$O$_3$), and magnesium oxide (MgO) were used as raw materials, powders of these raw materials were formulated to give a composition of, in % by mole, 13.0% Na$_2$O, 80.2% Al$_2$O$_3$, and 6.8% MgO, and the mixture was ground and mixed in ethanol for 10 hours with a ball mill using a 5-mm diameter $Al_2O_3$ ball. The obtained powder was formed into a 0.2-mm thick sheet, then isostatically pressed at a pressure of 40 MPa, and heat-treated in an air atmosphere at 1640° C. for an hour to obtain a solid electrolyte sheet made of MgO-stabilized β" alumina.

Furthermore, solid electrolyte powder (having an average particle size of 12 μm) was separately prepared by grinding the obtained solid electrolyte sheet with a planetary ball mill and passing the ground product through a sieve with 10-μm openings. When the powder X-ray diffraction pattern of the obtained solid electrolyte powder was checked, diffraction lines arising from $((Al_{10.32}Mg_{0.68}O_{16})(Na_{1.68}O))$ which is a trigonal crystal belonging to space group R-3m were confirmed.

(NASICON Crystal)

Sodium metaphosphate ($NaPO_3$), yttria-stabilized zirconia ($(ZrO_2)_{0.97}(Y_2O_3)_{0.03}$), sodium carbonate ($Na_2CO_3$), and silicon oxide ($SiO_2$) were used as raw materials, powders of these raw materials were formulated to give a composition of, in % by mole, 25.3% $Na_2O$, 31.6% $ZrO_2$, 1.0% $Y_2O_3$, 8.4% $P_2O_5$, and 33.7% $SiO_2$, and the mixture was ground and mixed in ethanol for 10 hours with a ball mill using a 5-mm diameter $Al_2O_3$ ball. The obtained powder was formed into a 0.2-mm thick sheet, then isostatically pressed at a pressure of 40 MPa, and heat-treated in an air atmosphere at 1250° C. for two hours to obtain a solid electrolyte sheet made of NASICON crystal.

Furthermore, solid electrolyte powder (having an average particle size of 12 μm) was separately prepared by grinding the obtained solid electrolyte sheet with a planetary ball mill and passing the ground product through a sieve with 10-μm openings. When the powder X-ray diffraction pattern of the solid electrolyte crystal was checked, diffraction lines arising from $(Na_{3.05}Zr_2Si_{2.05}P_{0.95}O_{12})$ which is a trigonal crystal belonging to space group R-3c were confirmed.

(3) Production of Solid-State Sodium-Ion Secondary Battery

The negative electrode active material precursor powder and solid electrolyte powder obtained in the above manners, and acetylene black (SUPER C65 manufactured by TIMICAL) as electrically conductive carbon were weighed in each ratio described in Table 8 and mixed at 300 rpm for 30 minutes using a planetary ball mill. Added to 100 parts by mass of the obtained mixture powder were 10 parts by mass of polypropylene carbonate (manufactured by Sumitomo Seika Chemicals Co., Ltd.) and additionally 30 parts by mass of N-methylpyrrolidinone. The mixture was fully stirred with a planetary centrifugal mixer to form a slurry.

The obtained slurry was applied, with an area of 1 cm² and a thickness of 80 μm, to one side of the solid electrolyte sheet described in Table 8 and then dried at 70° C. for three hours. Next, the obtained product was put into a carbon container and fired in a nitrogen atmosphere at 620° C. for an hour, thus forming a negative electrode layer. All the above operations were conducted in an environment of the dew point minus 50° C. or below.

When the powder X-ray diffraction patterns of the materials making up each of the negative electrode layers were checked, an amorphous hallow thought to arise from the negative electrode active material was confirmed. Regarding all the negative electrodes, respective crystalline diffraction lines arising from the solid electrolyte powders used were confirmed, but no crystalline diffraction line arising from the negative electrode active material was confirmed.

Next, a current collector formed of a 300-nm thick gold electrode was formed on the surface of the negative electrode layer using a sputtering device (SC-701AT manufactured by Sanyu Electron Co., Ltd.). Furthermore, in an argon atmosphere with the dew point minus 70° C. or below, a metallic sodium layer serving as a counter electrode was pressure-bonded to the surface of the solid electrolyte layer opposite to the surface thereof on which the negative electrode layer was formed. The obtained laminate was placed on top of a lower lid of a coin cell and capped with an upper lid of the coil cell to produce a CR2032-type test cell.

(4) Charge and Discharge Test

The produced test cells were CC charged at 60° C. from an open circuit voltage to 0.7 V and their amounts of electricity charged to the negative electrode active material per unit mass (first charge capacities) were determined. Next, the test cells were CC discharged from 0.7 V to 2.5 V and their amounts of electricity discharged from the negative electrode active material per unit mass (first discharge capacities) were determined. In this test, the C rate was 0.01 C and "Discharge Capacity Retention" was evaluated as a rate of the 10th cycle discharge capacity to the first discharge capacity. The results are shown in Table 8.

As is obvious from Table 8, as for Nos. 36 to 38, the discharge voltage and the discharge capacity retention were 1.29 V or less and 98% or more, respectively, and these characteristics were excellent.

INDUSTRIAL APPLICABILITY

The negative electrode active material for a power storage device according to the present invention is suitable for power storage devices used in portable electronic devices, electric vehicles, electric power tools, backup emergency power supplies, and so on.

The invention claimed is:

1. A negative electrode active material for a power storage device, the negative electrode active material containing as elements at least one selected from Si, B, P, and Al; Nb; and O;

the negative electrode active material containing, in terms of % by mole of oxide, 18 to 90% $Nb_2O_5$, and 5 to 85% $SiO_2+B_2O_3+P_2O_5+Al_2O_3$;

the negative electrode active material containing an amorphous phase;

the negative electrode active material has a structure in which Nb ions as an active material component are dispersed in an oxide matrix containing Si, B, P, or Al; and the negative electrode active material is made of a glass or a crystallized glass.

2. The negative electrode active material for the power storage device according to claim 1, the negative electrode active material further containing, in terms of % by mole of oxide, 1 to 70% $R_2O+R'O$ (where R represents at least one selected from Li, Na, and K and R' represents at least one selected from Mg, Ca, Ba, Zn, and Sr).

3. The negative electrode active material for the power storage device according to claim 2, wherein $R_2O$ is $Na_2O$.

4. The negative electrode active material for the power storage device according to claim 1, wherein the negative electrode active material is for use in a sodium-ion secondary battery.

5. A negative electrode material for the power storage device, the negative electrode material containing the negative electrode active material according to claim 1.

6. A negative electrode for the power storage device, the negative electrode containing the negative electrode material according to claim 5.

7. The power storage device comprising the negative electrode according to claim 6.

* * * * *